US011583792B2

(12) United States Patent
Buscicchio et al.

(10) Patent No.: US 11,583,792 B2
(45) Date of Patent: Feb. 21, 2023

(54) FLUID FILTER DEVICE

(71) Applicant: Dana Motion Systems Italia S.R.L., Reggio Emilia (IT)

(72) Inventors: Luca Buscicchio, Nonantola (IT); Piergiorgio Trinchieri, Reggio Emilia (IT)

(73) Assignee: Dana Motion Systems Italia S.R.L., Reggio Emilia (IT)

( * ) Notice: Subject to any disclaimer, the term of this patent is extended or adjusted under 35 U.S.C. 154(b) by 0 days.

(21) Appl. No.: 17/064,449

(22) Filed: Oct. 6, 2020

(65) Prior Publication Data
US 2021/0101098 A1 Apr. 8, 2021

(30) Foreign Application Priority Data
Oct. 8, 2019 (EP) .................................... 19201946

(51) Int. Cl.
*B01D 35/143* (2006.01)
*B01D 35/147* (2006.01)
*B01D 29/33* (2006.01)

(52) U.S. Cl.
CPC ......... *B01D 35/143* (2013.01); *B01D 35/147* (2013.01); *B01D 29/33* (2013.01)

(58) Field of Classification Search
CPC .... B01D 29/33; B01D 35/143; B01D 35/147; F02M 37/36
USPC ........................................................ 210/131
See application file for complete search history.

(56) References Cited

U.S. PATENT DOCUMENTS

| | | | | |
|---|---|---|---|---|
| 2,287,344 A * | 6/1942 | Easton | ................... | B01D 29/11 210/443 |
| 2,524,336 A * | 10/1950 | Vokes | .................. | B01D 35/153 210/443 |
| 3,314,541 A | 4/1967 | Rosaen | | |
| 3,323,649 A | 6/1967 | Rosaen | | |
| 4,428,834 A | 1/1984 | McBroom et al. | | |
| 9,550,136 B2 * | 1/2017 | Carpenter | ............ | B01D 35/147 |
| 2008/0053879 A1 * | 3/2008 | Harris | ..................... | B01D 27/08 210/90 |
| 2016/0059164 A1 | 3/2016 | Plickys | | |
| 2019/0217229 A1 * | 7/2019 | Rookey | ............... | B01D 35/005 |

OTHER PUBLICATIONS

European Patent Office, Extended European Search Report Issued in Application No. 19201946.1, dated Mar. 19, 2020, 8 pages.

\* cited by examiner

*Primary Examiner* — Terry K Cecil
(74) *Attorney, Agent, or Firm* — McCoy Russell LLP

(57) ABSTRACT

A fluid filter device with a housing defining a cavity, the housing including a fluid inlet and a fluid outlet, a filter unit including a filter substrate and arranged within the cavity such that the filter unit and the housing define, within the cavity, a first chamber in fluid communication with the fluid inlet and a second chamber in fluid communication with the fluid outlet. The filter unit is movable relative to the housing between a first position and a second position such that in the first position, the first chamber is in fluid communication with the second chamber through the filter substrate, and in the second position, the inlet is in fluid communication with the outlet through a bypass line.

20 Claims, 3 Drawing Sheets

FLUID FILTER DEVICE

CROSS-REFERENCE TO RELATED APPLICATION

The present application claims priority to European Patent Application No. 19201946.1, entitled "FLUID FILTER DEVICE", and filed on Oct. 8, 2019. The entire contents of the above-listed application are hereby incorporated by reference for all purposes.

TECHNICAL FIELD

The present disclosure concerns a fluid filter device, in particular a fluid filter device comprising a filter unit with a filter substrate. A fluid filter of the type disclosed here may be connectable to a fluidic system for removing particulate matter from a fluid circulating in the fluidic system. In particular, the fluidic system may be a pressurized fluidic system, such as a hydraulic system, for example a hydraulic power unit.

BACKGROUND AND SUMMARY

Numerous examples of fluid filter devices of the aforementioned kind are known in the art. During operation of such a fluid filter device, the filter substrate may become clogged due to the accumulation of particulate matter on or within the filter substrate. This may lead to a compromised function of a connected fluidic system and/or damage to system components.

Various different solutions to this problem have been proposed, typically involving a bypass mechanism that allows fluid to bypass the filter substrate when the filter substrate is clogged. For example, document US 2008/0053879 A1 discloses an oil bypass device comprising a filter fixed to an engine block by screwing it to an attached connecting sleeve. The connecting sleeve contains a bypass valve in the form of a tubular piston sliding in a through-passage and pushed against an intermediate shoulder by a spring. By sliding, the piston opens or closes a radial passage establishing direct communication between the inlet passage and the through-passage of the device. If the filter element of the filter is clogged, the pressure rise in the inlet passage causes the piston to move and the radial passage to open to reduce the pressure rise and ensure a satisfactory flow of oil.

Conventional approaches to providing a bypass mechanism, such as the approach described in the aforementioned document, may introduce many additional parts, in particular movable parts, and—correspondingly—lead to additional complexity and increased size of the fluid filter device. Consequently, such devices may be expensive to produce, of limited durability, difficult to service, and/or difficult to adapt to standardized form factor sockets or connections of common hydraulic systems.

Accordingly, a problem to be solved by the present disclosure is to provide a fluid filter device that avoids or reduces the aforementioned shortcomings.

This problem is solved by a fluid filter device according to the described embodiments.

A fluid filter device according to the described embodiments comprises a housing defining a cavity, the housing comprising a fluid inlet and a fluid outlet, and a filter unit comprising a filter substrate and arranged within the cavity such that the filter unit and the housing define, within the cavity, a first chamber in fluid communication with the fluid inlet and a second chamber in fluid communication with the fluid outlet.

The housing may be formed integrally or comprise multiple components. The housing and/or components of the housing may comprise or be composed of a rigid, pressure-resistant and/or corrosion-resistant material such as a metal or a polymer. The housing and/or components of the housing may be produced, for example, by a casting process and/or a molding process and/or a machining process.

The first chamber may be defined by a first inner surface of the housing and a first surface of the filter unit. The second chamber may be defined by a second inner surface of the housing and a second surface of the filter unit.

The filter substrate may be any type of substrate suitable for allowing a fluid to pass through while retaining particulate matter of a certain size range. For example, the filter substrate may comprise a porous material, in particular a sintered material, such as sintered bronze.

The filter unit is movable relative to the housing between a first position and a second position such that in the first position, the first chamber is in fluid communication with the second chamber through the filter substrate, and in the second position, the inlet is in fluid communication with the outlet through a bypass line.

The proposed fluid filter device thus provides a simple bypass mechanism with a small number of movable parts. The complexity, size, and/or production cost of the fluid filter device may be reduced; its durability may be improved. Maintenance of the fluid filter device may be simplified by making the filter unit itself—which is typically an easily replaced consumable—the main moving part of the bypass mechanism.

A fluid filter device of the proposed kind is particularly easy to adapt to standardized form factors. For example, it may be possible to provide a standard hydraulic power pack housed in a die-cast housing with a fluid filter device of the proposed kind, which is easily adapted to fit into typically available ports without the need to need a dedicated adapter manifold.

Typically, the fluid filter device is configured to allow for a fluid, in particular a liquid such as oil or water, to flow through the cavity from the fluid inlet to the fluid outlet.

More particularly, at least when the filter unit is in the first position, a flow path may be provided in which the fluid enters the first chamber through the fluid inlet, passes through the filter substrate into the second chamber and exits the second chamber through the fluid outlet.

Moreover, at least when the filter unit is in the second position, an additional bypass flow path comprising the aforementioned bypass line may be accessible such that fluid may flow from the first chamber to the fluid outlet (with or without first passing through the second chamber) through the bypass line, without passing through the filter substrate.

When the filter unit is in the second position, the bypass flow path may be partially or fully disconnected from the first chamber such that fluid contained in the first chamber is prevented from flowing into the bypass line. The bypass flow path being partially disconnected means that a small amount of fluid leakage from the first chamber into the second chamber without passing through the filter substrate may be possible. The bypass flow being fully disconnected means that such a leakage is prevented.

The filter unit may be movable between the first position and the second position by a fluid pressure differential between the first chamber and the second chamber. In this way, activation of the bypass mechanism may be provided in response to a pressure buildup in the first chamber, which typically accompanies clogging of the filter substrate.

The filter unit may be movable from the first position to the second position when an over pressure in the first chamber with respect to a pressure in the second chamber exceeds a threshold pressure differential. With an appropriate value of the threshold pressure differential, a good balance of proper functioning of the fluid filter device and a low risk of damage to the device or a system connected to the device may be ensured.

The filter unit may be movable between the first position and the second position by a linear motion. Such a linear degree of freedom of the motion of the filter unit allows for a particularly simple and robust construction of the fluid filter device. Alternatively, the filter unit may be movable between the first position and the second position by a motion different from a linear motion, such as a circular motion, a spiral motion, a tilting motion, or a combination of different types of motion.

The filter unit may be movable between the first position and the second position along a first axis. The filter unit may have a first surface portion and a second surface portion opposite the first surface portion. A surface area of the first surface portion may be larger than a surface area of the second surface portion, such that the fluid pressure differential between the first chamber and the second chamber causes a first force acting on the first surface portion and a second force acting on the second surface portion, wherein a component of the first force parallel to the first axis is larger than and opposite to a component of the second force parallel to the first axis.

The fluid filter device may comprise a biasing member configured to bias the filter unit towards the first position. Providing the fluid filter device with such a biasing member ensures that during normal operation, i.e. when the filter substrate is not clogged, the filter unit is in the first position.

A biasing force or biasing strength of the biasing member and/or a ratio of the surface area of the first surface portion and the surface area of the second surface portion may be chosen to determine the value of the aforementioned threshold pressure differential.

The housing may comprise a plug portion projecting outward from an outer portion of the housing. In particular, the plug portion may comprise the fluid inlet and/or the fluid outlet and/or be complementary in shape and size to a standard fluidic port, such as a two-way cavity of a hydraulic system, such that the fluid filter system is easily adapted to many applications. An outer surface of the plug portion may comprise a threaded portion. The threaded portion may be configured to mate with a threaded portion of a fluidic port or connector, contributing to the versatile application and simple replaceability of the fluid filter device.

The plug portion may comprise a fluid channel, the fluid channel fluidly connecting the second chamber with the fluid outlet. The plug portion may—alternatively or additionally—comprise at least part of the second chamber.

The housing may comprise an inwardly protruding portion, the inwardly protruding portion protruding into the cavity formed within the housing. The inwardly protruding portion may comprise a fluid channel, the fluid channel fluidly connecting the second chamber with the fluid outlet. For example, the inwardly protruding portion may be formed as an extension, e.g. a coaxial extension, of the plug portion, in particular such that the fluid channel of the inwardly protruding portion is an extension of the fluid channel of the plug portion.

The filter unit may be slidably mounted on the inwardly protruding portion of the housing. This way of constructing the fluid filter device has several advantages. For example, the motion of the filter unit between the first position and the second position may be implemented as a simple sliding motion. Moreover, the slidable mounting may provide a particularly simple way of attaching and replacing the filter unit. Finally, when the inwardly protruding portion is parallel to the first axis and inserted into an opening in the second surface portion, the resulting arrangement provides a simple way of reducing the surface area of the second surface portion to enable the pressure differential between the first chamber and the second chamber to drive a motion of the filter unit along the first axis as described above.

The bypass line may extend at least partially through the inwardly protruding portion of the housing and may be in fluid communication with the fluid channel. The filter unit may comprise a support element connectable or connected to the filter substrate, wherein the bypass line extends at least partially through the support element. The bypass line extending at least partially through the inwardly protruding portion of the housing, especially in combination with the bypass line extending at least partially through the support element, provides a simple way of closing or opening the bypass line depending on whether the filter unit is in the first position or the second position.

The filter substrate may be cup-shaped. The support element may form a lid of the filter substrate. Such a cup-and-lid structure of the filter unit adapts a common form factor of standard filter units to the proposed fluid filter system, making it possible to use the fluid filter system in combination with many existing systems without requiring major modifications.

The inwardly protruding portion of the housing may be received or configured to be received within an opening of the support element, providing a simple and robust implementation of the protruding portion being inserted into an opening in the second surface portion as described above.

The fluid filter device may comprise a status indicator configured to indicate, on an outside portion of the housing, whether the filter unit is in the first position or in the second position. A status indicator of this kind provides a simple way to determine from the outside whether the filter substrate is clogged and may need to be replaced.

The status indicator may comprise, for instance, a pressure gauge configured to indicate whether the pressure in the first chamber with respect to the second chamber exceeds the threshold pressure differential.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The above, as well as other advantages of the proposed fluid filter device, will become apparent to those skilled in the art from the following detailed description of exemplary embodiments of the fluid filter device when considered in the light of the accompanying drawings, which are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

Recurring features in FIGS. 1-3 are provided with identical reference numerals and may be partially omitted where these features are not referred to, in the following, with reference to a given drawing. Similar reference numerals may have been used in different figures to denote similar components. FIGS. 1-5 are shown approximately to scale, according to some embodiments. FIGS. 1-5 are shown with components in proportional size with one another, according to some embodiments.

DETAILED DESCRIPTION

Figure 1:
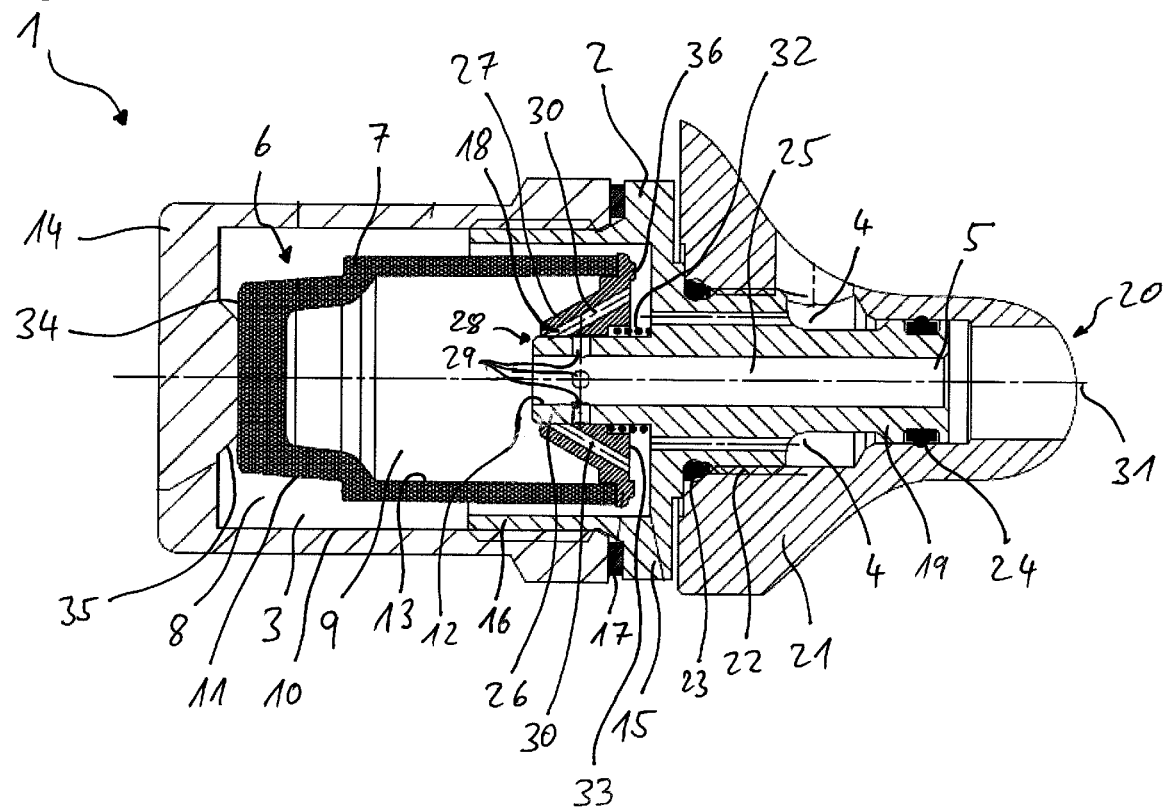
FIG. 1 shows, schematically, a cross-section of a fluid filter device according to the described embodiments with a filter unit in a first position.

The fluid filter device 1 shown in FIG. 1 is an oil filter device for a hydraulic power unit 21. However, this is merely an illustrative example; as explained above, many other configurations and applications of the fluid filter device are possible.

The fluid filter device 1 comprises a housing 2 defining a cavity 3, the housing 1 comprising a plurality of fluid inlets 4 and a fluid outlet 5. Depending on the design of the fluid filter device 1 and the intended application, the plurality of fluid inlets 4 may be replaced by a single fluid inlet.

A filter unit 6 comprising a cup-shaped filter substrate 7 is arranged within the cavity 3 such that the filter unit 6 and the housing 2 define, within the cavity 3, a first chamber 8 in fluid communication with the fluid inlets 4 and a second chamber 9 in fluid communication with the fluid outlet 5.

The first chamber 8 is defined by a first inner surface 10 of the housing 2 and a first surface 11 of the filter unit 6. The second chamber 9 is defined by a second inner surface 12 of the housing 2 and a second surface 13 of the filter unit 6.

The housing 2 comprises two components, a cup portion 14 and a lid portion 15. The cup portion 14 connectable to the lid portion 15 via a coupling portion 16 of the lid portion 15. A first gasket 17 is disposed between the cup portion 14 and the lid portion 15 as a seal. Alternatively, the housing 2 may be formed integrally.

The cup portion 14 and the lid portion 15 of the housing 2 are made of steel. However the housing 2 may comprise or be composed of other rigid, pressure-resistant and/or corrosion-resistant materials such as other metals and/or polymers.

The filter substrate 7 is a sintered bronze substrate. However, other types of filter substrates may be used, including other porous or fibrous materials such as other sintered metals and or a matrix of glass or polymer fibers.

The lid portion 15 of the housing 2 comprises a plug portion 19 projecting outward from an outer portion of the housing 2. The plug portion 19 comprises the fluid inlets 4 and the fluid outlet 5. The plug portion 19 is complementary in shape and size to a fluidic port 20 of the hydraulic power unit 21, to which the fluid filter system 1 is connectable.

An outer surface of the plug portion 19 comprises a threaded portion 22. The threaded portion 22 is configured to mate with a threaded portion of the fluidic port 20. A second gasket 23 and a third gasket 24 may be disposed between the plug portion 19 and the fluidic port 20 to create a tight seal.

The plug portion 19 comprises a fluid channel 25, the fluid channel 25 fluidly connecting the second chamber 9 with the fluid outlet 5.

The housing 2 comprises an inwardly protruding portion 26, the inwardly protruding portion 26 protruding into the cavity 3 formed within the housing 2. The inwardly protruding portion 26 is formed as a coaxial extension of the plug portion 19 such that the fluid channel 25 extends through both the plug portion 19 and the inwardly protruding portion 26.

The filter unit 6 comprises a support element 27 which forms a lid of the cup-shaped filter substrate 7. The inwardly protruding portion 26 of the housing 2 is slidably received within an opening 28 of the support element 27, i.e. the filter unit 6 is slidably mounted on the inwardly protruding portion 26.

To ensure unimpeded flow and distribution of fluid within the first chamber 8, in particular within spaces between the filter unit 6 and inner walls of the housing 2, the housing 2 comprises a first spacing element 35, and the filter unit 6 comprises a second spacing element 36. The first spacing element 35 is formed as a protrusion of the cup portion 14 of the housing 2. The second spacing element 36 is formed as two disk segment-shaped protrusions of the support element 27 of the filter unit 6. Alternative shapes of the first and second spacing element 35 and 36 are possible.

A plurality of first bypass segments 29 extend through the inwardly protruding portion 26, each of the first bypass segments 29 being in fluid communication with the fluid channel 25. The first bypass segments 29 are radial bores in the inwardly protruding portion 26. A plurality of second bypass segments 30—each corresponding to one of the plurality of first bypass segments 29—extend through the support element 27, each of the second bypass segments 30 being in fluid communication with the first chamber 8. The number of first and second bypass segments 29 and 30 may be adapted to the design of the fluid filter device 1 or the intended application.

Figure 3:
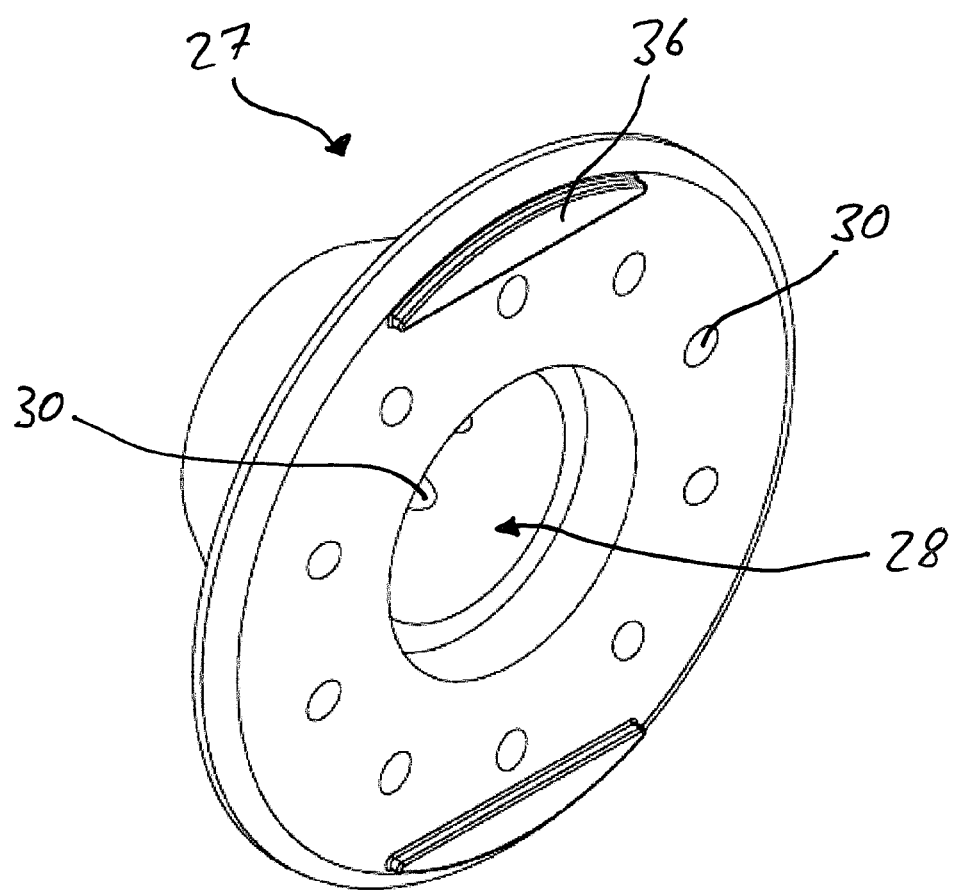
FIG. 3 shows a perspective view of a support element of the fluid filter device of FIGS. 1-2.

FIG. 3 shows a detailed view of the support element 27, in which the opening 28, the plurality of second bypass segments 30, and the second spacing element 36 are clearly visible.

Figure 2:
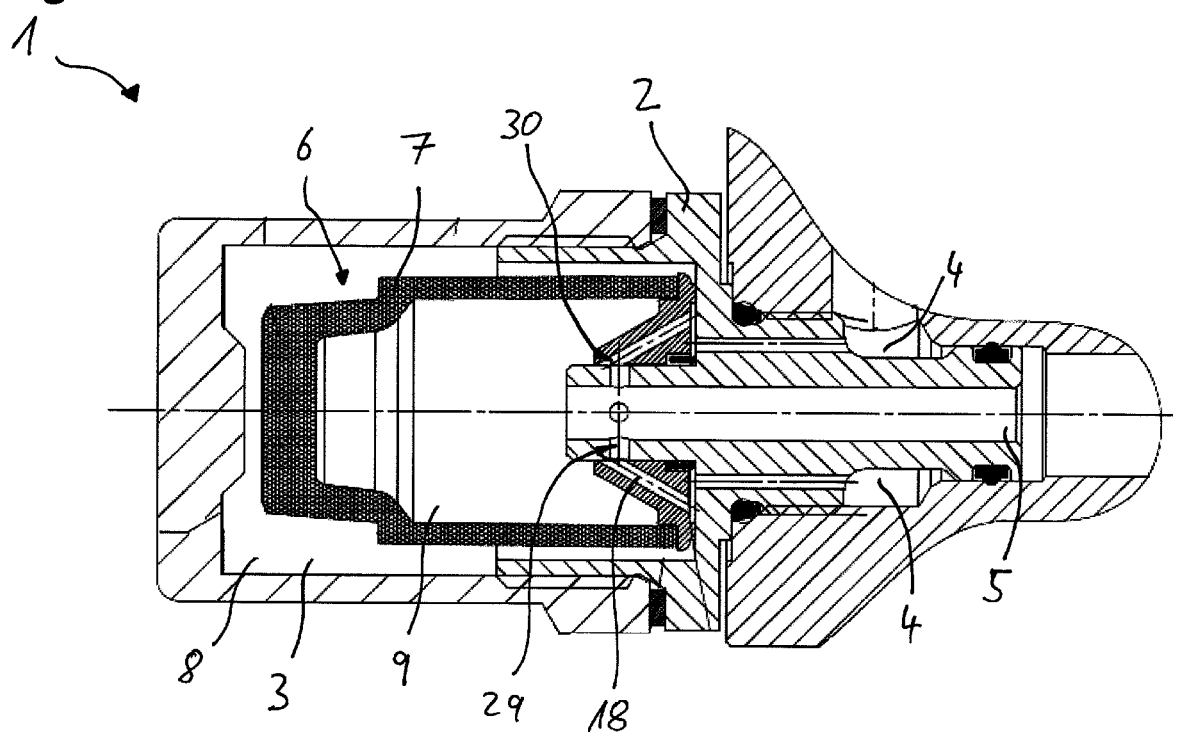
FIG. 2 shows, schematically, a cross-section of the fluid filter device of FIG. 1 with the filter unit in a second position.

As shown in FIG. 1, the plurality of first bypass segments 29 and the plurality of second bypass segments 30 form a plurality of bypass lines 18. The first and second bypass elements 29 and 30 may be connected or disconnected, i.e. the bypass line 18 may be opened or closed, by moving the filter unit 6 relative to the housing 2 along a first axis 31 between a first position (shown in FIG. 1) and a second position (shown in FIG. 2).

Movement of the filter unit 6 between the first position and the second position occurs by a linear motion, more specifically by sliding of the filter unit 6, which—as mentioned above—is slidably mounted on the inwardly protruding portion 26 of the housing 2—towards the lid portion 15 of the housing 2 (towards the second position) or away from the lid portion 15 (towards the first position).

The fluid filter device 1 comprises a spring as a biasing member 32. The biasing member 32 is arranged between the lid portion 15 of the housing 2 and the support element 27 of the filter unit 6, around the inwardly protruding portion 26. In this way, the biasing element 32 is configured to bias the filter unit 6 towards the first position.

In the following, an operation of the fluid filter device 1 is described. Under operating conditions, the cavity 3 of the housing 2 is at least partially filled with a fluid, in the present example, oil.

In the absence of a buildup of particulate matter on or within the filter substrate 7, i.e. when the filter substrate 7 is not clogged, fluid may pass through the filter substrate 7 under intended operating pressures. In this situation, an elastic force exerted by the biasing member 32 upon the filter unit 6 is sufficient to keep the filter unit 6 in the first position.

In the first position (FIG. 1), the first chamber 8 is in fluid communication with the second 9 chamber through the filter substrate 7. The first bypass segments 29 and the second bypass segments 30 are disconnected such that the bypass lines 18 are closed.

Correspondingly, the fluid filter device 1 is configured to allow for the fluid to flow through the cavity 3 from the fluid inlets 4 to the fluid outlet 5. More particularly, when the filter unit 6 is in the first position, a flow path is provided in which the fluid enters the first chamber 8 through the fluid inlets 4, passes through the filter substrate 7 into the second chamber 9 and exits the second chamber 9 through the fluid outlet 5.

When particulate matter builds up on or within the filter substrate 7 over the course of operation, i.e. when the filter substrate 7 becomes clogged, an over pressure in the first chamber 8 with respect to the second chamber 9, i.e. a fluid pressure differential between the first chamber 8 and the second chamber 9, increases.

The filter unit 6 has a first surface portion 33 and a second surface portion 34 opposite the first surface portion 33. The first surface portion 33 is a surface portion of the filter substrate 7 oriented away from the lid portion 15 of the housing 2. The second surface portion 34 is a surface portion of the support element 27 oriented towards the lid portion 15 of the housing 2. Due to the inwardly protruding portion 26 of the lid portion 15 being inserted into the opening 28 of the support element 27, a surface area of the first surface portion 33 is larger than a surface area of the second surface portion 34, such that the fluid pressure differential between the first chamber 8 and the second chamber 9 causes a first force acting on the first surface portion 33 and a second force acting on the second surface portion 34, wherein a component of the first force parallel to the first axis 31 is larger than and opposite to a component of the second force parallel to the first axis 31. Consequently, a resulting force towards the lid portion 15 (i.e. acting towards the second position) is exerted upon the filter unit 6.

When the over pressure in the first chamber 8 with respect to the pressure in the second chamber 9 exceeds a threshold pressure differential, the resulting force exerted upon the filter unit 6 due to the pressure differential exceeds the counteracting elastic force exerted upon the filter unit 6 by the biasing member 32, and the filter unit 6 is moved into the second position.

In the second position (FIG. 2), the inlets 4 are in fluid communication with the outlet 5 through the bypass line 18. The first bypass segments 29 and the second bypass segments 30 are connected such that the bypass lines 18 are open. In other words, an additional bypass flow path comprising the bypass lines 18 is accessible such that fluid may flow from the first chamber 8 to the fluid outlet 5 through the bypass lines 18, without passing through the filter substrate 7.

Figure 4:
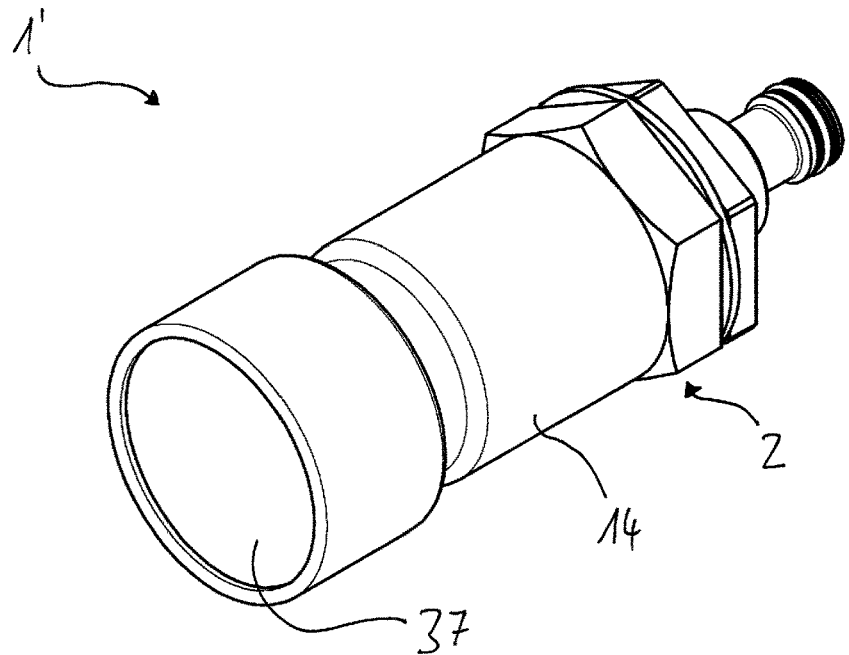
FIG. 4 shows a perspective view of another example of a fluid filter device according to the described embodiments.

The fluid filter device 1' shown in FIG. 4 is nearly identical to the fluid filter device 1 and its features are therefore referred to with the same reference numerals. The distinguishing feature of the fluid filter device 1' compared to the fluid filter device 1 is that the fluid filter device 1' comprises a status indicator 37. The status indicator 37 is arranged on an outside portion of the cup portion 14 of the housing 2.

Figure 5:
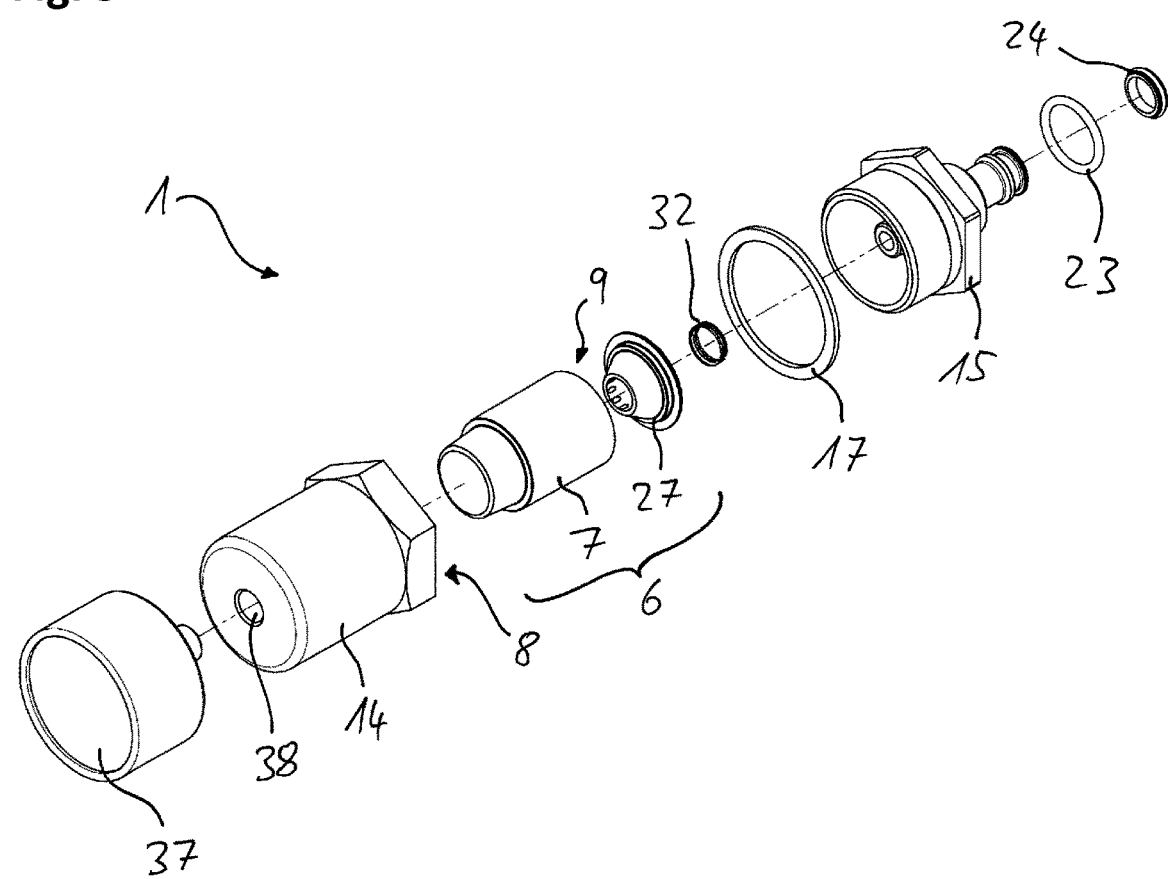
FIG. 5 shows an exploded view of the fluid filter device of FIG. 4.

FIG. 5 shows an exploded view of the fluid filter device 1', in which the individual components of the fluid filter device 1'—the status indicator 37, the cup portion 14 and the lid portion 15 of the housing 2, the filter substrate 7 and the support element 27 of the filter unit 6, the biasing member 32, the first gasket 17, the second gasket 23, and the third gasket 24.

The status indicator 37 is a pressure gauge connected to the first chamber 8 via an axial bore 38 in a wall of the cup portion 14 of the housing 2.

In this way, the status indicator 37 is configured to indicate whether the pressure in the first chamber 8 with respect to the second chamber 9 exceeds the threshold pressure differential, and thus, whether the filter unit 6 is in the first position or in the second position. In this way, it is possible to determine from the outside whether the filter substrate 7 is clogged and may need to be replaced.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The foregoing description is considered as illustrative only of the principles of the invention. Further, since numerous modifications and changes will readily occur to those skilled in the art, it is not desired to limit the invention to the exact construction and processes shown and described herein. Accordingly, all suitable modifications and equivalents may be considered as falling within the scope of the invention as defined by the claims which follow.

LIST OF REFERENCE NUMERALS 1, 1' Fluid filter device
2 Housing
3 Cavity
4 Fluid inlet
5 Fluid outlet
6 Filter unit
7 Filter substrate
8 First chamber
9 Second chamber
10 First inner surface
11 First surface
12 Second inner surface
13 Second surface
14 Cup portion
15 Lid portion
16 Coupling portion
17 First gasket
18 Bypass line
19 Plug portion
20 Fluidic port
21 Hydraulic power unit
22 Threaded portion
23 Second gasket
24 Third gasket
25 Fluid channel
26 Inwardly protruding portion
27 Support element
28 Opening
29 First bypass segment
30 Second bypass segment
31 First axis
32 Biasing member
33 First surface portion
34 Second surface portion
35 First spacing element
36 Second spacing element
37 Status indicator
38 Axial bore

The invention claimed is:

1. A fluid filter device, comprising:
a housing defining a cavity; and
a filter unit comprising a filter substrate and a support element, the filter unit arranged within the cavity such that the filter unit and the housing define, within the cavity, a first chamber in fluid communication with a fluid inlet and a second chamber in fluid communication with a fluid outlet,
the housing comprises the fluid inlet and the fluid outlet,
the support element of the filter unit is received around an exterior of a protruding portion of the housing, the filter substrate and the support element of the filter unit are movable relative to the protruding portion between a first position and a second position such that, in the first position, the first chamber is in fluid communication with the second chamber through the filter substrate, and, in the second position, bypass segments in the exterior of the protruding portion of the housing align with bypass segments of the support element to connect the fluid inlet with the fluid outlet through a bypass line, and
a biasing element urges the filter unit away from the fluid inlet and fluid outlet into the first position, and fluid pressure urges the filter unit towards the fluid inlet and fluid outlet into the second position.

2. The fluid filter device according to claim 1, wherein the filter unit is movable between the first position and the second position by a fluid pressure differential between the first chamber and the second chamber.

3. The fluid filter device according to claim 1, wherein the filter unit is movable from the first position to the second position when an over pressure in the first chamber with respect to a pressure in the second chamber exceeds a threshold pressure differential and forces the filter unit in a direction towards the fluid inlet and fluid outlet.

4. The fluid filter device according to claim 1, wherein the filter unit is movable between the first position and the second position by a linear motion.

5. The fluid filter device according to claim 4, wherein the filter unit is movable between the first position and the second position along a first axis, the filter unit has a first surface portion and a second surface portion opposite the first surface portion, and a surface area of the first surface portion is larger than a surface area of the second surface portion, such that the fluid pressure differential between the first chamber and the second chamber causes a first force acting on the first surface portion and a second force acting on the second surface portion, wherein a component of the first force parallel to the first axis is larger than and opposite to a component of the second force parallel to the first axis.

6. The fluid filter device according to claim 1, wherein the biasing member is between the housing and the support element of the filter unit.

7. The fluid filter device according to claim 1, wherein the protruding portion of the housing comprises the fluid inlet and the fluid outlet, and the housing further comprises (i) a plug portion comprising a threaded portion to fluidly connect the fluid filter device to a second device, and (ii) a cup portion which defines the cavity attaching to the protruding portion at an end thereof.

8. The fluid filter device according to claim 1, wherein the protruding portion protrudes into the cavity formed within the housing, wherein the protruding portion comprises a fluid channel, the fluid channel fluidly connecting the second chamber with the fluid outlet.

9. The fluid filter device according to claim 8, wherein the filter unit is slidably mounted on the protruding portion of the housing.

10. The fluid filter device according to claim 8, wherein the protruding portion of the housing is received within an opening of the support element.

11. The fluid filter device according to claim 8,
wherein a plurality of first bypass segments, each in fluid communication with the fluid channel, form passages extending through a wall of the protruding portion and a plurality of second bypass segments, each corresponding to one of the plurality of first bypass segments and each in communication with the first chamber, form passages extending through a wall of the support element such that the plurality of first bypass segments and the plurality of second bypass segments form the bypass line, and
wherein, in the first position, the first and second bypass segments are disconnected such that the bypass line is closed, and in the second position, the first and second bypass elements are connected such that the bypass line is opened.

12. The fluid filter device according to claim 1, wherein the bypass segments in the protruding portion are passages formed through a wall of the protruding portion, the bypass segments of the support element are passages extending through a wall of the support element, and the passages through the walls align to form the bypass line.

13. The fluid filter device according to claim 12, wherein the filter substrate is cup-shaped and the support element forms a lid of the filter substrate.

14. The fluid filter device of claim 1, wherein the bypass segments of the support element extend from a radial surface of the support element to an axial surface of the support element in contact with the protruding portion.

15. A fluid filter device, comprising:
a housing defining a cavity;
an inlet and an outlet;
a filter unit comprising a filter substrate and a support element, the support element of the filter unit is received around an exterior of a protruding portion of the housing, the filter substrate and the support element are movable relative to the protruding portion along an axis between a first position and a second position;
in the first position, fluid flows from the inlet to the outlet through the filter substrate, and
in the second position, first bypass segments in the exterior of the protruding portion of the housing align with second bypass segments of the support element forming a bypass line and fluid flows from the inlet to the outlet through the bypass line, the support element extending radially outward from the protruding portion of the housing containing the first bypass segments to form a radial surface, and the second bypass segments extend from the radial surface of the support element to an axial surface of the support element in contact with the protruding portion.

16. The fluid filter device of claim 15, wherein in the second position, a spacing element of the support element contacts the housing and maintains a distance between the support element and the housing to maintain fluid flow between the support element and the housing.

17. The fluid filter device of claim 15, wherein a biasing element urges the filter unit away from the inlet and outlet into the first position, and fluid pressure urges the filter unit towards the housing into the second position.

18. The fluid filter device of claim 17, wherein the filter substrate is cup shaped and attaches to the support element to form an interior chamber.

19. The fluid filter device of claim 18, wherein entrances to the second bypass segments on the radial surface of the support element are arranged circumferentially around the protruding portion.

20. The fluid filter device of claim 15, wherein the first bypass segments in are passages formed through a wall of the protruding portion, the second bypass segments are passages extending through a wall of the support element, and the passages through the walls align to form the bypass line.

* * * * *